(12) United States Patent
Rufino et al.

(10) Patent No.: US 10,189,555 B2
(45) Date of Patent: Jan. 29, 2019

(54) ROTARY BALL LOCK LATCHING MECHANISM

(71) Applicant: Northrop Grumman Systems Corporation, Falls Church, VA (US)

(72) Inventors: John Rufino, Long Beach, CA (US); Kevin A. Noertker, Los Angeles, CA (US); Charles R. Smith, Acton, CA (US); Cory Combs, Del Aire, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 475 days.

(21) Appl. No.: 14/790,871

(22) Filed: Jul. 2, 2015

(65) Prior Publication Data

US 2017/0001705 A1 Jan. 5, 2017

(51) Int. Cl.
*F16B 21/02* (2006.01)
*B64C 1/14* (2006.01)
*F16B 5/06* (2006.01)

(52) U.S. Cl.
CPC .......... *B64C 1/1446* (2013.01); *B64C 1/1461* (2013.01); *F16B 21/02* (2013.01); *F16B 5/0642* (2013.01)

(58) Field of Classification Search
CPC ... Y10T 403/592; Y10T 403/593; B64C 1/38; F16B 21/165; F16B 21/02; F16B 21/04; F16B 21/16; F16B 5/10
See application file for complete search history.

(56) References Cited

U.S. PATENT DOCUMENTS

| | | | |
|---|---|---|---|
| 2,916,768 A | 12/1959 | Quere et al. |
| 3,046,827 A | 7/1962 | Myers |
| 3,827,110 A | 8/1974 | Dzus et al. |
| 3,879,970 A | 4/1975 | Salzman et al. |
| 4,040,151 A | 8/1977 | Brimm |
| 4,594,040 A | 6/1986 | Molina |
| 4,946,209 A | 8/1990 | Stauner |

(Continued)

FOREIGN PATENT DOCUMENTS

EP   0247956   12/1987

OTHER PUBLICATIONS

PCT Interntaional Search Report and Written Opinion, International Application No. PCT/US2016/037368, dated Sep. 16, 2016, 11 pages.

*Primary Examiner* — Daniel J Wiley
(74) *Attorney, Agent, or Firm* — Stetina Brunda Garred and Brucker

(57) ABSTRACT

A latching mechanism is provided for engaging an aircraft surface panel to a support member. The aircraft panel is provided with a post extending from the lower surface, which extends through a panel support member into a post engagement mechanism. The post engagement mechanism defines a rotatable sleeve, which rotates for locking and unlocking engagement between the post and the post engagement mechanism. Locking engagement continues when power to the post engagement actuator is terminated. The post engagement mechanism may utilize various types of actuators, including mechanical, hydraulic, and pneumatic. The aircraft panel and the panel support member are translatable into and out of abutting engagement independent of the need for any contact with the aircraft panel upper surface.

20 Claims, 3 Drawing Sheets

(56) References Cited

U.S. PATENT DOCUMENTS

| | | |
|---|---|---|
| 5,468,106 A | 11/1995 | Percival |
| 5,967,571 A | 10/1999 | Gregerson |
| 7,185,852 B2 | 3/2007 | Kannapell |
| 8,056,862 B1 | 11/2011 | Tomerlin et al. |
| 8,225,694 B2 | 7/2012 | Kennedy et al. |
| 8,500,436 B2 | 8/2013 | Rentz |
| 9,527,139 B2 * | 12/2016 | Mellstrom .............. B23B 31/24 |
| 2003/0189279 A1 | 10/2003 | Yonezawa et al. |
| 2007/0196196 A1 * | 8/2007 | Schorling ............... F16B 21/04 411/555 |
| 2009/0038471 A1 * | 2/2009 | Tanaka ................... B25B 5/062 92/187 |

* cited by examiner

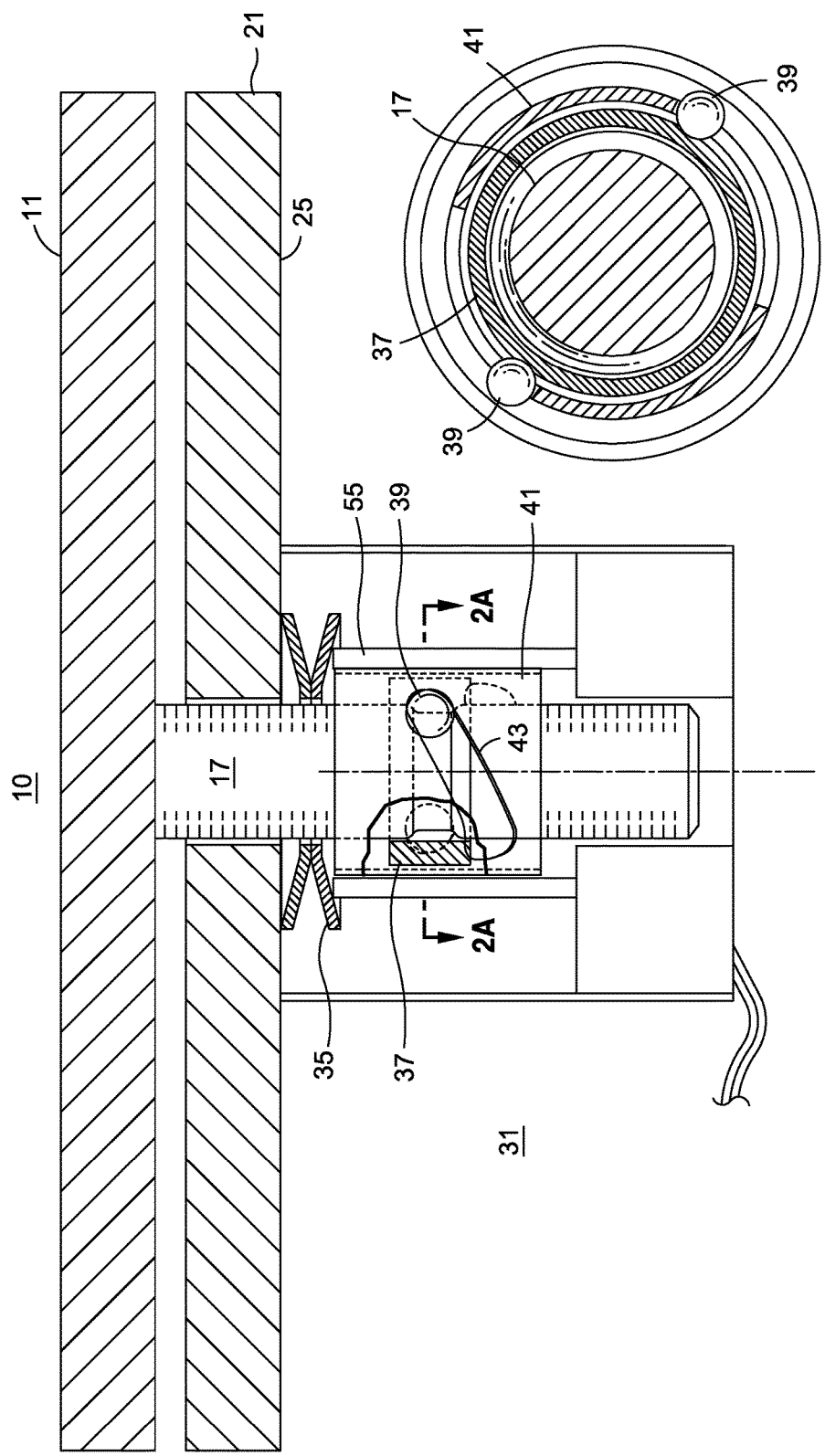

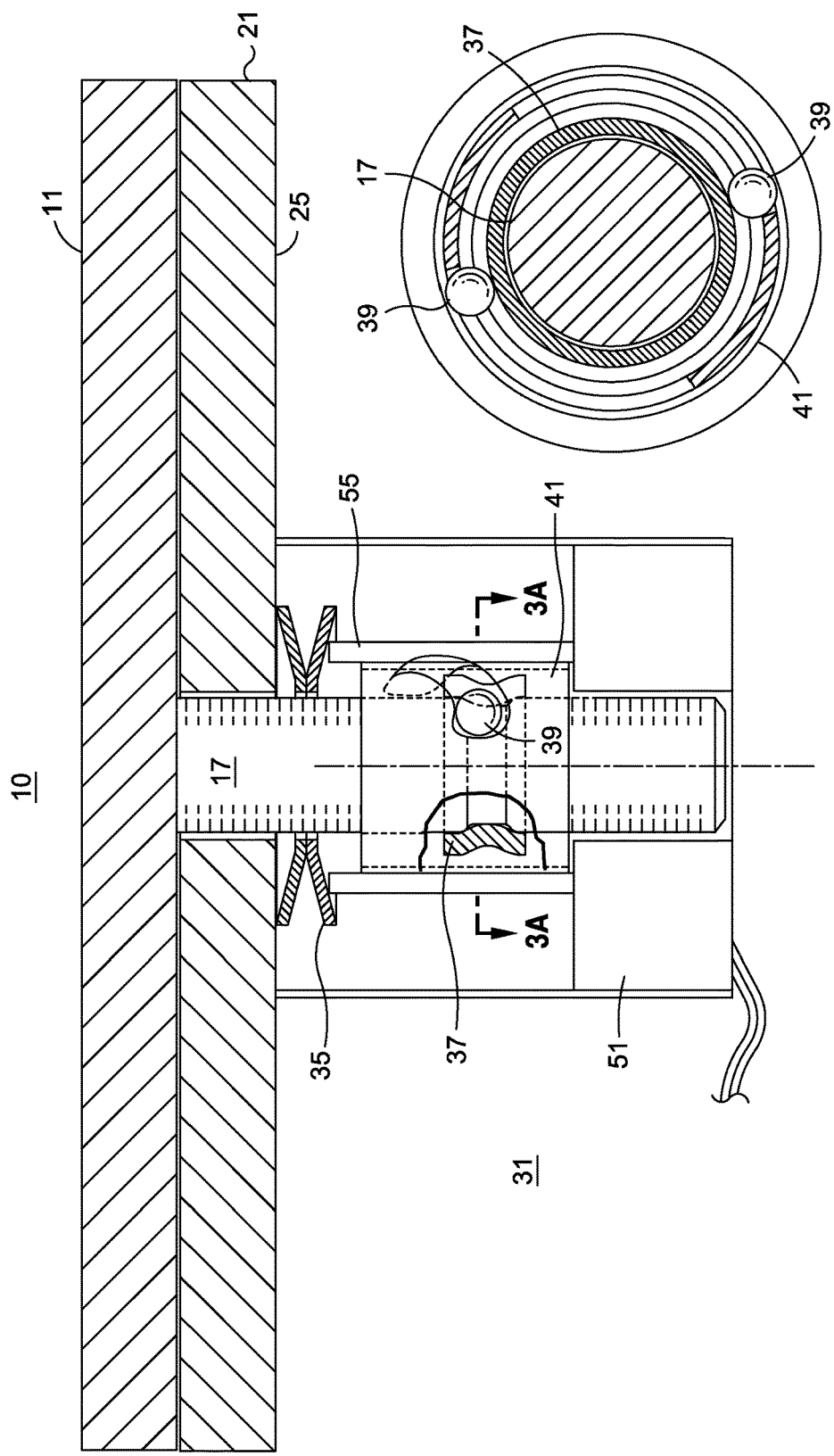

ROTARY BALL LOCK LATCHING MECHANISM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a latching mechanism that allows a removable access panel to separate from a supporting surface when access to the aircraft interior is desired. More particularly, the present invention relates to a latching mechanism suitable for rapid removal and reinstallation of aircraft outer mold line (OML) panels and doors.

In the building of aircraft, both civil and military, exterior panels, doors and other structures are provided which can be removed for repair or to allow access to aircraft systems, e.g. mechanical, electrical or hydraulic, disposed within the body of the aircraft. The panel doors are preferably formed flush with the adjacent aircraft surface, to avoid interference with aerodynamic characteristics of the aircraft. Irregularities in an aircraft surface can also mitigate low observable characteristics of an aircraft, as RF signals may reflect from surface irregularities and detract from low observable characteristics of the aircraft.

While panels may be conventionally engaged to an aircraft surface by means of screws or similar fasteners, such connecting means commonly require torqueing the fasteners to a desired pressure, can result in wear and loosening of the fasteners during use, and can preload the panels into undesirable levels. Moreover, in practical circumstances of use, fasteners can fall into the aircraft interior when installing or removing the panel, creating potentially hazardous conditions with respect to mechanical and electrical systems disposed in the vicinity. As such, alternative latching mechanisms are desirable in order to allow for greater ease of installation and removal, avoidance of creating undue loads on panel and mitigating the prospect of accidentally releasing undesirable debris within the aircraft body which may be difficult to locate and potentially damaging to aircraft electrical and mechanical systems. Further, as noted above, it is desirable such that latching mechanism exhibit minimal surface irregularities, to retain desired aerodynamic and low observable characteristics. Ideally the latching mechanism will allow installation and removal of the panel without the need to even touch the panel upper surface. Preferably, such latching system will also provide suitable sealing characteristics to facilitate airtight and watertight isolation of the aircraft electrical/mechanical/hydraulic systems, as well as mitigating the potential for noise associated with gaps between adjacent aircraft surface portions.

These and other objects and advantages are addressed in the present invention, which is described in exemplary terms below, in connection with the illustrated embodiments.

BRIEF SUMMARY

A latching mechanism is provided for engaging an aircraft surface panel to a support member. The aircraft panel is provided with a post extending from the lower surface, which extends through a panel support member into a post engagement mechanism. The post engagement mechanism defines a rotatable sleeve, which rotates for locking and unlocking engagement between the post and the post engagement mechanism. Locking engagement continues when power to the post engagement actuator is terminated. The post engagement mechanism may utilize various types of actuators, including mechanical, hydraulic, and pneumatic. The aircraft panel and the panel support member are translatable into and out of abutting engagement independent of the need for any protrusions through or any contact with the aircraft panel upper surface.

In accordance with the invention, the panel and panel support member are translatable into and out of abutting contact in response to rotation of a rotatable sleeve disposed in the post engagement mechanism. As the rotatable sleeve is rotated in the first direction, the post is urged downwardly, within the post engagement mechanism, to bring the panel into abutting engagement with the panel support member. Once the post and the post engagement mechanism are brought into locking engagement, the locking engagement continues independent of the need for any power to be applied to the actuator or the rotating sleeve.

When the rotatable sleeve is rotated in a second direction, the post is urged upwardly, out of locking engagement with the post engagement mechanism, causing separation of the panel from the panel support member, and facilitating removal of the panel.

In one embodiment the latching mechanism further comprises a spring, such as a Belleville spring, disposed intermediate the post engagement mechanism and the panel support member. The spring may be compressed upon translation of the post into the post engagement mechanism, and is operative to oppose translation out of the post engagement mechanism, upon termination of power to the actuator or the rotatable sleeve.

In one embodiment, the rotatable sleeve has an inner surface which defines at least one spiral groove, having a groove first end and a groove second end. A ball is disposable in the groove and is translatable between the first end and second end. A resilient, i.e. deformable, sleeve is also disposed within the post engagement mechanism, inward of the rotatable sleeve. The resilient sleeve is brought into contact with the ball, as the ball translates within the groove between the groove first end to the groove second end.

Rotation of the sleeve in a first direction causes the ball, rotatable sleeve, deformable sleeve and the post to collectively translate downwardly, within the post engagement mechanism.

Rotation of the rotatable sleeve in a first direction urges the ball to travel to the shallower portion of the groove, where the ball is urged against the deformable sleeve, causing greater deformity of the deformable sleeve into the post recess, until the ball, in cooperation with the deformable sleeve and rotatable sleeve, cause the post to be in locking engagement with post engagement mechanism.

Rotation of the rotatable sleeve in a second direction causes the rotatable sleeve, deformable sleeve, ball, and the post to translate within the post engagement mechanism in an upward direction, and out of locking engagement.

Correspondingly, the aircraft panel and the panel support member are drawn into abutting relation as the post moves downwardly within the post engagement mechanism, and out of abutting relation as the post translates upwardly.

An actuator is provided in the post engagement mechanism for rotating the rotatable sleeve. In one embodiment the rotatable sleeve is provided with a geared or otherwise serrated lower surface connectable to a rotatable member in the actuator. In one embodiment the actuator is powered by electrical power. Alternatively, the actuator may operate on hydraulic or pneumatic power, provided by an external hydraulic or pneumatic supply.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 is cross-sectional view of the rotatable locking mechanism wherein the rotatable sleeve and the deformable sleeve are disposed in a first position;

FIG. 2A is a top sectional view of the rotatable locking mechanism taken along the plane to 2A, as shown at FIG. 2;

FIG. 3 is cross-sectional view of the rotatable locking mechanism wherein the rotatable sleeve and the deformable sleeve are disposed in a second position; and FIG. 3A is a top sectional view of the rotatable locking mechanism taken along the lines of 3A, as shown at FIG. 3.

DETAILED DESCRIPTION

Figure 1:
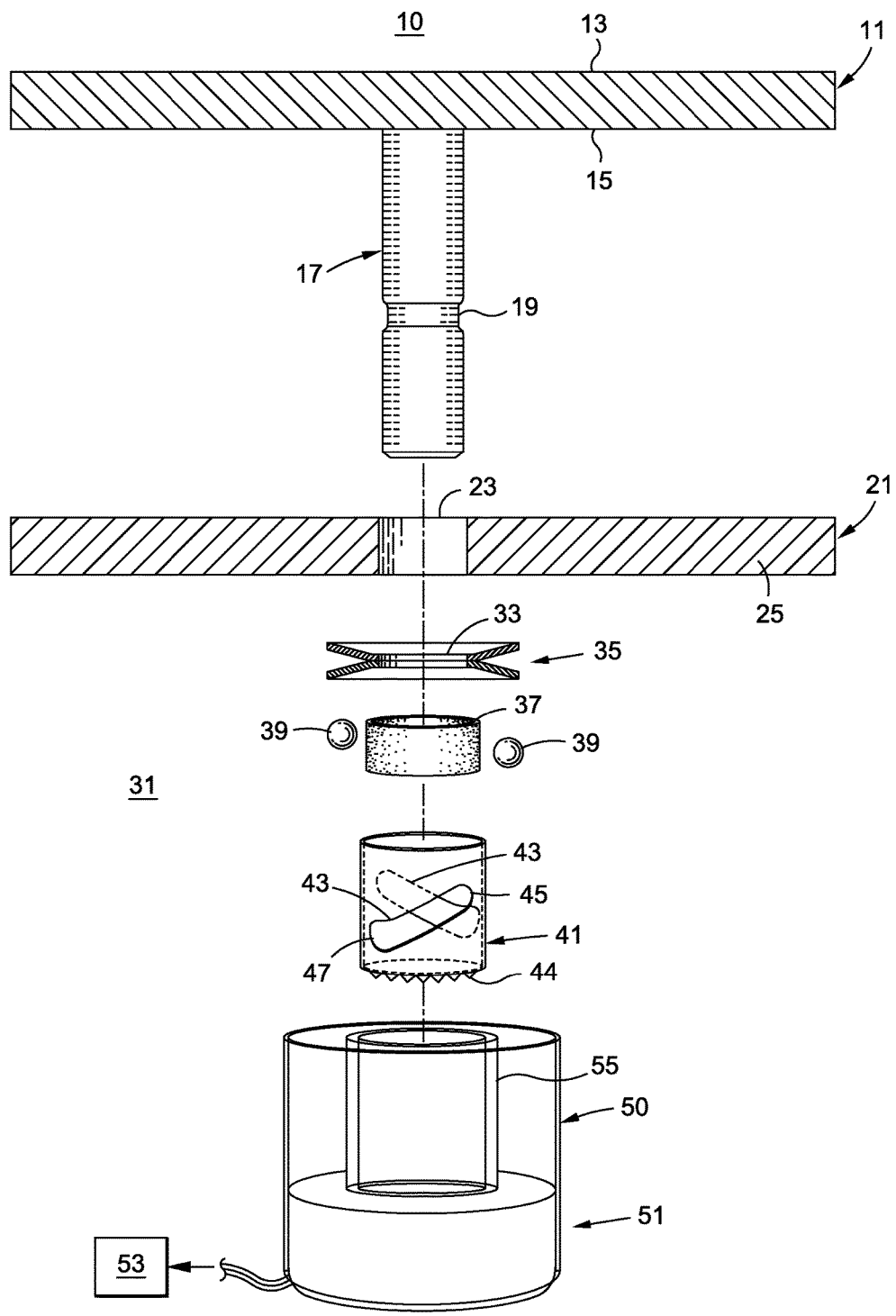
FIG. 1 is an exploded view of a rotatable panel locking mechanism in accordance with one embodiment of the present invention.

The detailed description below is given by way of example, and not limitation. Given the disclosure, one skilled in the art could devise variations that are within the scope and spirit of the invention disclosed herein, including various ways of implementing the actuator to power the post engagement mechanism, different ways to draw the post into the post engagement mechanism, different ways to cause the post to be in locking engagement with the post engagement mechanism and different ways to oppose release of the post after power to the actuator has been terminated. Further, the various features of the embodiments disclosed herein can be used alone, or in varying combinations with each other and are not intended to be limited to the specific combination described herein. Thus, the scope of the claims is not to be limited by the illustrated embodiments.

FIG. 1 provides one exemplary embodiment of a latching mechanism 10, for engaging an aircraft surface panel to a support member. As shown at FIG. 1, latching mechanism 10 comprises of an aircraft panel 11 having an uninterrupted upper surface 13 and lower surface 15. Post 17 extends from lower surface 15 of panel 11, and defines a circumferential recess 19 formed thereabout.

Panel support member 21 extends substantially parallel to panel 11 and defines a post receiving aperture 23, through which post 17 may extend. Post engagement mechanism 31 is disposed adjacent the second surface 25 of support panel 21. The post engagement mechanism defines a central aperture 33 disposed in substantial vertical alignment with the post receiving aperture 23, for receiving and engaging the post 17.

The post engagement mechanism 31 further defines a rotatable sleeve 41, which, as described further below, is rotatable to enable locking and unlocking engagement between the post 17 and the post engagement mechanism 31.

Post engagement mechanism actuator 51, disposed in housing 50, is connected to external power source 53. The actuator 51 is operative to engage rotatable sleeve 41 for rotation thereof. The rotatable sleeve 41 may be provided with a geared or otherwise serrated lower surface 44 to facilitate rotation of rotatable sleeve 41 by actuator 51.

As further shown at FIGS. 2, 2A, 3, and 3A, rotatable sleeve 41 is provided with at least one groove 43, which extends from a groove upper end 45 to groove lower end 47. In one embodiment, the groove is formed to have a substantially spiral shape, and defines different depths along the length of the groove. In the presently preferred embodiment, groove 43 defines a maximum depth at groove first end 45, and a minimal depth at groove lower end 47. In between the ends 45, 47 the groove defines an intermediate depth, for reasons described further below. The rotatable sleeve 41 is disposed within a guide collar 55 and is rotatable therein.

Deformable sleeve 37 is disposed within rotatable sleeve 41 and, during operation of the post engagement mechanism 31, is vertically translatable therein. Ball 39 is also disposed within rotatable sleeve 41, within groove 43. The ball 39 is disposed intermediate the groove 43 and the deformable sleeve 37.

When the ball 39 is in disposed within the deeper groove first end 45, the ball does not frictionally engage the deformable sleeve 37, and the post 17 may translate within the post engagement mechanism 31.

When the ball 39 is disposed in the shallow groove second end 47, the deformable sleeve 37 is deformed inwardly into post recess 19, causing locking engagement between the post 17 and the post engagement mechanism 31.

As the ball translates between the groove first end 45 and groove lower end 47, in the intermediate depth portion of groove 43, the ball 39 is in contact with deformable sleeve 37, urging the sleeve 37 into frictional engagement with post 17, such that post 17 and deformable sleeve 37 move upwardly and downwardly within the rotatable sleeve 41, in accordance with the position of the ball 39 within the groove 43.

As will be apparent to one of ordinary skill in the art, the specific length of the post 17, the position of the recess groove 19, and the dimensions of rotatable sleeve 41, deformable sleeve 37, and groove 43 are selected such that the ball 39 and sleeve 37 enter into locking engagement with post recess 19, when the ball 39 translates to the lower end 47 of groove 43. Further, the same dimensions are selected to enable the post 17, and the attached panel 11, to translate upwardly from support 21, to facilitate removal of the panel 11 when ball 39 translates to upper end 45 of groove 43.

In presently preferred embodiment, the post engagement mechanism 31 further includes spring member 35 disposed adjacent lower surface 25 of support member 21. The spring member 35 further defines aperture 33 to facilitate translation of post 17 therethrough. In the presently preferred embodiment, spring member 35 is constructed as a Belleville spring, or a combination of Belleville springs, which serve to maintain the post 17 in position, unless overcome by a force that is defined by the construction of the Belleville spring. When the post 17 translates within the post engagement mechanism 31, and is in locking engagement thereto, the spring member 35 functions to maintain the post 17 in place within the post engagement mechanism 31, when power to actuator 51 is terminated. However, when power to actuator 51 is restored, and the rotatable sleeve 41 is rotated in a second direction, the spring member 35 allows the post to translate upwardly within the post engagement mechanism 31, so that the panel 11 is spaced from support member 21.

When the rotatable sleeve rotates to cause ball 39 to reach groove first end 45, where the ball 39 disengages from the deformable sleeve 37, the spring member 35 maintains the post 17 in its elevated position to allow for ease of remove by lifting the panel 11, which may readily be effected with sufficient force to overcome the retaining characteristics of spring member 35.

FIGS. 2 and 2A exemplify an embodiment wherein the post 17 is disposed in post engagement mechanism 31 while the ball 39 is disposed in the upper end 45 of groove 43. As shown therein, the panel 11 is spaced from support member 23.

FIGS. 3 and 3A illustrates the same embodiment, wherein the rotatable sleeve 41 has rotated in a first direction, causing ball 39 to translate to groove lower end 47. As the groove lower end 47 is shallower, the ball 39 is pressed against the deformable 37, causing the ball 39 and sleeve 37 to press into and engage recess 19 of post 17. Under those circumstances the panel 11 is brought into substantial engagement with the support member 21.

As noted above, those skilled in the art will recognize that the construction features and functions described herein may be modified to implement the invention in alternative arrangements, where are intended to be encompassed within the spirit and scope of the same invention.

The invention allows the aircraft panel and panel support member to be translated into and out of abutting engagement independent of any contact with the aircraft panel upper surface.

Moreover, the actuator 51 has been described as an electro mechanical mechanism, it should be understood that the actuator 51 may alternately be implemented as a hydraulic or pneumatic mechanism, operative to rotate a rotatable sleeve 41, in which case the actuator would alternately be connected to a hydraulic or pneumatic power source.

What is claimed is:

1. A latching mechanism for engaging an aircraft surface panel to a support member comprising:
   an aircraft surface panel defining an upper surface, a lower surface, and a post extending from the lower surface, the post defining a circumferential recess formed thereabout;
   a panel support member extending substantially parallel to the aircraft surface panel, the panel support member defining a post receiving aperture formed therethrough;
   a post engagement mechanism disposed adjacent the support panel lower surface, the post engagement mechanism defining a central aperture in substantial vertical alignment with the post receiving aperture, for receiving and engaging the post;
   the post engagement mechanism further defining a rotatable sleeve, the rotatable sleeve being rotatable to enable locking and unlocking engagement between the post and the post engagement mechanism; and
   a post engagement mechanism actuator, connectable to a power source, in operative engagement with the rotatable sleeve for rotation thereof;
   wherein the aircraft surface panel and the panel support member are translatable into and out of abutting engagement independent of any contact with the aircraft surface panel upper surface; and
   wherein locking engagement between the post and the post engagement mechanism continues when power to the actuator is terminated.

2. The latching mechanism as recited in claim 1 wherein the aircraft surface panel and the panel support member are translatable into and out of abutting contact upon rotation of the rotatable sleeve.

3. The latching mechanism as recited in claim 1 wherein upon rotation of the rotatable sleeve in a first direction, the post is urged downwardly, within the post engagement mechanism, to bring the aircraft surface panel into abutting engagement with the panel support member.

4. The latching mechanism as recited in claim 1 wherein upon rotation of the rotatable sleeve in a second direction, the post is urged upwardly out of locking engagement with the post engagement mechanism, causing separation of the aircraft surface panel from the panel support member and facilitating removal of the aircraft surface panel.

5. The latching mechanism as recited in claim 1 wherein locking engagement between the post and the post engagement mechanism continues independent of any power applied to the actuator.

6. The latching mechanism as recited in claim 3 further comprising a spring member disposed intermediate the post engagement mechanism and the panel support member, the spring member being compressed upon rotation of the sleeve in the first direction.

7. The latching mechanism as recited in claim 6 wherein the spring member is operative to oppose upward translation of the post, out of the post engagement mechanism, upon termination of power to the actuator.

8. The latching mechanism as recited in claim 1 wherein:
   the rotatable sleeve defines an inner surface thereof, the inner surface defining at least one groove having a first end and a second end, the groove being characterized by a maximum depth from the first end, a minimal depth at the second end and an intermediate depth between the groove first end and the groove second end; and
   wherein the post engagement mechanism further defines
      a ball disposed in the groove and translatable between the groove first end and the groove second end;
      a resilient sleeve disposed radially inward of the rotatable sleeve, the resilient sleeve being progressively deformable by the ball as the ball translates within the groove intermediate the groove first end and the groove second end; and
      wherein the resilient sleeve is deformable in response to rotation of the rotatable sleeve to the groove second end, to engage the circumferential recess to effect locking engagement of the post and the post engagement mechanism.

9. The latching mechanism as recited claim 8 wherein the groove is formed as a substantially spiral groove.

10. The latching mechanism as recited in claim 8 wherein the groove defines a ball seating area extending radially inward from the groove.

11. The latching mechanism as recited in claim 8 wherein the rotatable sleeve is rotatable to move the ball radially in and out of engagement with the resilient sleeve for locking and unlocking the post and the post engagement mechanism.

12. The latching mechanism as recited in claim 8 wherein rotation of the rotatable sleeve in a first direction urges the resilient sleeve to engage the post and to urge the post downwardly and into the post engagement mechanism, urging the aircraft surface panel to abut against the panel support member.

13. The latching mechanism as recited in claim 8 wherein rotation of the rotatable sleeve in a second direction urges the resilient sleeve to engage the post and to urge post upwardly and out of the post engagement mechanism, urging the aircraft surface panel to separate from the panel support member.

14. The latching mechanism as recited in claim 8 wherein upon rotation of the rotatable sleeve in a first direction the ball translates from the groove first end to the groove second end, and the post translates downwardly within the post engagement mechanism, to bring the post in locking engagement with the post engagement mechanism and the panel into abutting engagement with the aircraft surface panel support member.

15. The latching mechanism as recited in claim 14 wherein rotation of the rotatable sleeve in a second direction urges the ball to translate to a deeper portion of the groove, to allow the ball to disengage from the resilient sleeve, and to allow the resilient sleeve to disengage from the post.

16. The latching mechanism as recited in claim 15 wherein upon rotation of the rotatable sleeve in the second direction, the ball translates from the groove second end to the groove first end, unlocking the post and the post engaging mechanism and urging the aircraft surface panel to translate upwardly, out of abutting engagement with the panel support member.

17. The latching mechanism as recited in claim 8 wherein the translation of the ball to the groove second end causes deformation of the resilient sleeve into the circumferential recess.

18. The latching mechanism as recited in claim 8 wherein the resilient sleeve is resiliently deformable to translate between a substantially cylindrical shape when the ball is disposed at the groove first end to a substantially deformed cylindrical shape when the ball is disposed at the groove second end.

19. A ball latching mechanism for engaging an aircraft surface panel comprising:
 an aircraft surface panel defining an upper surface, a lower surface, and a post extending perpendicular from the lower surface, the post defining a circumferential recess formed thereabout;
 a panel support member extending substantially parallel to the aircraft surface panel, the panel support member defining a post receiving aperture formed therethrough;
 a post engaging mechanism disposed adjacent the support panel lower surface, the post engaging mechanism defining a central aperture in substantial vertical alignment with the post receiving aperture, for receiving and engaging the post;
 the post engaging mechanism further defining a rotatable sleeve defining an inner surface thereof, the inner surface defining at least one groove having an upper end and lower end, the groove characterized by a maximum depth at the groove upper end and a minimum depth at the groove lower end;
 a ball disposed in the groove and translatable between the groove upper end and the groove lower end;
 a resilient sleeve disposed radially inward of the groove, the resilient sleeve abutting against the ball and being deformable by the ball as the ball moves to the groove lower end; and
 wherein the resilient sleeve and the post vertically translate within the circumferential recess in response to rotation of the rotatable sleeve and translation of the ball between the groove upper end and the groove lower end to urge the panel into and out of abutting engagement with the aircraft surface panel support member.

20. A latching mechanism for engaging an aircraft surface panel to a panel support member comprising:
 an aircraft surface panel defining an upper surface, a lower surface, and a post extending from the lower surface, the post defining a circumferential recess formed thereabout;
 a panel support member extending substantially parallel to the aircraft surface panel, the panel support member defining a post receiving aperture formed therethrough;
 a post engagement mechanism disposed adjacent the support panel lower surface, the post engagement mechanism defining a central aperture in substantial vertical alignment with the post receiving aperture, for receiving and engaging the post;
 the post engagement mechanism further defining a rotatable sleeve, the rotatable sleeve being rotatable to enable locking and unlocking engagement between the post and the post engagement mechanism; and
 a post engagement mechanism actuator, connectable to a power source, in operative engagement with the rotatable sleeve for rotation thereof;
 wherein the aircraft surface panel defines an uninterrupted upper surface; and
 wherein locking engagement between the post and the post engagement mechanism continues when power to the actuator is terminated.

\* \* \* \* \*